Aug. 12, 1969 A. H. LAMB 3,460,389
THERMOMETER FOR MEASURING SKIN TEMPERATURE
Filed Sept. 25, 1967 2 Sheets-Sheet 1

INVENTOR
ANTHONY H. LAMB
BY
Rudolph J. Jureck
ATTORNEY

Aug. 12, 1969 A. H. LAMB 3,460,389
THERMOMETER FOR MEASURING SKIN TEMPERATURE
Filed Sept. 25, 1967 2 Sheets-Sheet 2

INVENTOR
ANTHONY H. LAMB

BY
Rudolph J. Jurick
ATTORNEY

United States Patent Office 3,460,389
Patented Aug. 12, 1969

3,460,389
THERMOMETER FOR MEASURING SKIN TEMPERATURE
Anthony H. Lamb, 66 King St.,
Hillside, N.J. 07205
Filed Sept. 25, 1967, Ser. No. 670,163
Int. Cl. G01k 5/64
U.S. Cl. 73—363.7     3 Claims

ABSTRACT OF THE DISCLOSURE

A thermometer for measuring skin temperature over selected areas of the body. A spiral, bi-metallic coil is secured to a staff carrying a pointer rotatable over a calibrated scale. The staff is pivotally supported by a heat transfer disc arranged for direct contact with the skin.

Background of the invention

It is known that a difference in skin temperature between proximate areas of the body may be taken as an indication of the presence of disease located in the area having the higher than normal temperature. Thermography is the term applied to a relatively new diagnostic procedure for locating elevated temperature areas on the body. In this procedure, infrared rays from the body are detected, by a scanning method, and converted to a photograph. Such equipment is expensive and not available to the average physician. Similar results, for practical purposes, can be obtained by means of direct reading thermometers placed on, or attached to, selected areas of the body to be explored. Unfortunately, small, inexpensive, easy to read thermometers, suitable for this purpose, heretofore have not been available.

Generally, the skin temperature, at an effected area, will vary from +1 to +5° F., above normal, depending upon the particular individual, the specific area of the body being investigated and the severity of the disease. Thus, it often is desirable to use two or more identical thermometers for the simultaneous measurement of a plurality of adjacent skin areas, in order to eliminate as many variables as possible. Desirably, then, the thermometers should be of a small size, inexpensive, easy to read, have a fast response, a high accuracy and good precision.

Summary of the invention

The invention relates to bimetallic thermometers for the measurement of skin temperature over relatively small areas of the body. A spiral, bimetallic coil has its inner convolution secured to a staff passing through an opening in a metal casing carrying a calibrated scale. A pointer, secured to the upper end of the staff is movable over the scale and a pivot, carried by the lower end of the staff, is rotatably supported by a heat transfer disc. The casing and the heat transfer disc are disposed in a plastic housing formed of two sections, the upper housing section being transparent and overlying the scale, and the lower housing section being provided with an opening through which the heat transfer disc extends for direct contact with the skin. Flexible, plastic straps are provided for the attachment of one or more of the thermometers in operative position to certain parts of the body as, for example, the arm, forehead, etc.

An object of this invention is the provision of a thermometer particularly adapted for the measurement of skin temperature over a relatively small area of the body, which thermometer is of inexpensive construction, easy to read, has a fast response, and is not materially influenced by ambien temperature during use.

An object of this invention is the provision of a bimetallic thermometer wherein the pointer is secured to a staff pivotally supported by a heat transfer member arranged for direct contact with a relatively small area of the skin, said thermometer having a fast response, high accuracy and an easy to read scale, whereby selected areas of the skin can be explored quickly and conveniently for the purpose of detecting a specific skin area having a higher than normal temperature.

The above-stated and other objects and advantages of the invention will become apparent from the following description when taken with the accompanying drawings showing several embodiments of the invention. It will be understood, however, that the drawings are for purposes of illustration and are not to be construed as defining the scope or limits of the invention, reference being had for the latter purpose to the claims appended hereto.

Brief description of the drawings

In the drawings wherein like reference characters denote like parts in the several views:

Reference now is made to FIGURES 1–3 wherein there is shown an outer housing comprising a plastic base 10 having a reduced-diameter shoulder 11 for receiving a clear plastic cover 12, said cover being relatively thin and having an inside diameter corresponding to the outside diameter of the shoulder. Thus, the cover is secured in place by reason of the friction fit between the shoulder and the overlying cover wall. Alternatively, the cover can be secured to the base by means of a suitable adhesive. Visible through the clear cover 12, FIGURE 1, is a scale calibrated in temperature values, a pointer 13 and a pointer stop 14. The flat wall of the base 10, FIGURE 3, is provided with a circular opening 15 having a circular portion 16, of a metal case, passing therethrough, as will be described more specifically hereinbelow. This portion 16 has a plurality of openings 17 formed therein and carries a heat transfer member 18. Also formed in the housing base 10 is an opening 19 accommodating a zero-corrector screw 20. Formed integrally with the base 10 is an external, circular lip 21.

Figure 1:
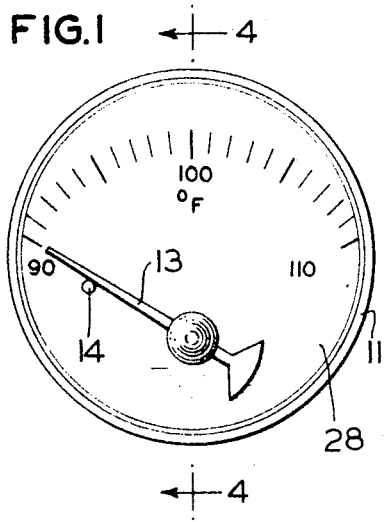
FIGURES 1–3 are, respectively, front, side and rear elevational views of a thermometer made in accordance with one embodiment of the invention.
Figure 2:
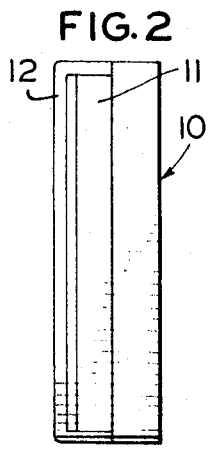
Figure 3:
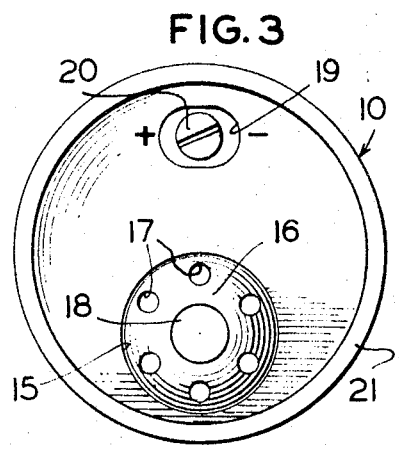
Figure 4:
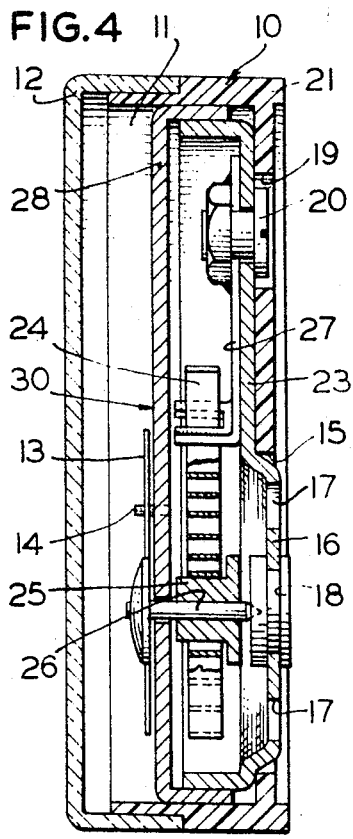
FIGURE 4 is a cross-sectional view taken along the line 4—4 of FIGURE 1 and drawn to an enlarged scale.

Referring specifically to the enlarged, cross-sectional view of FIGURE 4, the above-mentioned metal case is identified by the numeral 23 said case having its base portion depressed to form the circular portion 16 which extends through the circular opening 15 formed in the housing base 10. The inner convolution of a spiral, bimetallic coil 24 is secured to a metal bushing 25, which bushing is secured to a staff 26 carrying the pointer 13. The other end of the staff is formed into a pivot rotatable in a conical bore formed in the heat transfer element 18, said element being made of a good, heat-conducting metal such as copper, and being staked to the circular portion 16 of the metal case 23. The outer convolution of the bimetallic coil 24 terminates in a radially-offset end disposed between the bifurcated offset end of an abutment 27 secured to the zero-corrector screw 20. A metal cover 28 is snap-fitted over the metal case 23. The calibrated temperature scale, visible through the transparent cover 12, is formed on the outer surface 30, of the metal cover 28. It will be apparent that the metal case 23 and the metal cover 28 form a casing carrying the complete thermometer having an exposed pointer and scale. It is here pointed out that such casing has an outside diameter such that the casing fits snugly within the plastic base 10, which base, together with the transparent cover 12, forms an outer housing for the thermometer. It will be noted that the outer surface of the heat transfer element 18 lies flush with the outer wall of the circular lip 21. The thermometers herein described, including the outer housing, have a diameter of 1¼ inch and a thickness of ⅜ inch. When the thermometer is placed against the body, the outer lip and the heat transfer member are in contact with the skin. Thus, the bimetallic coil responds rapidly to the temperature of a relatively small area of the skin, by reason of heat conduction through the element 18 and heat convection through the openings 17, and the lip 21 blocks the flow of air currents along the area of skin being measured, thereby minimizing the effect of ambient temperature upon the thermometer indication.

Figure 6:
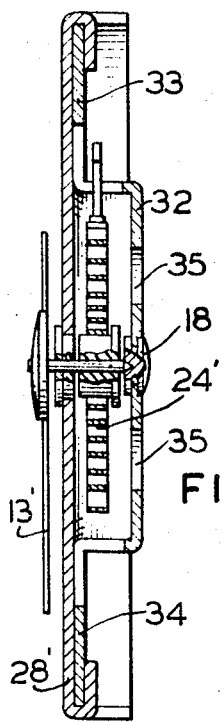
FIGURE 6 is an enlarged cross-sectional view taken along the line 6—6 of FIGURE 5.
Figure 5:
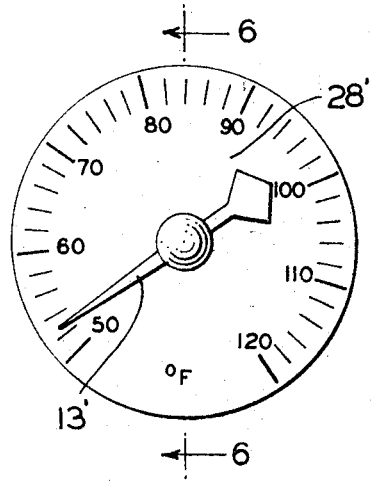
FIGURE 5 is, a front elevational view of a thermometer made in accordance with another embodiment of the invention.

A modification of the thermometer construction is shown in FIGURES 5 and 6. Here, the heat transfer member 18 is carried by a metal cup 32 having integral, diametrically-opposed tabs 33, 34 welded, or otherwise secured to the outer metal case 28', and provided with a plurality of openings 35. The offset end of the bimetallic coil 24' passes through a slot formed in the side wall of the cup. In the case of a thermometer provided with a zero-corrector, this slot has a width sufficient to permit the necessary amount of arcuate movement of the coil end in response to rotation of the zero-corrector screw. In the case of a nonadjustable thermometer, the coil end is merely fastened to the cup 32. The metal cover 28', carrying the calibrated scale, has an outside diameter which is the same as that of the metal cover 28 shown in FIGURE 4. However, the side wall of the cover 28' has an axial length somewhat greater than that of the cover 28, so that the ends of such side wall will seat against the inner flat wall of the outer base, which base corresponds to the base 10 shown in FIGURE 4 but provided with a central, circular opening for receiving the cup 32 of FIGURE 6.

Figure 7:
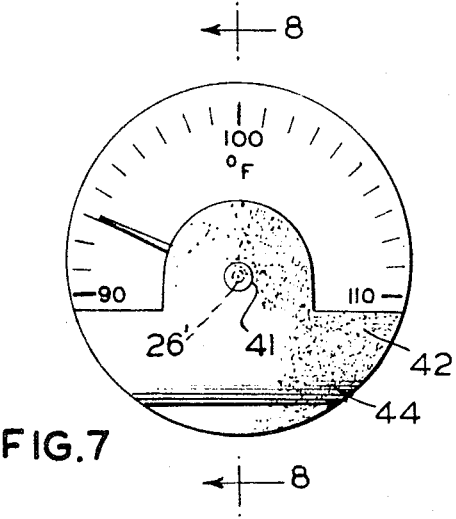
FIGURE 7 is a front elevational view of a thermometer made in accordance with still another embodiment of the invention.
Figure 8:
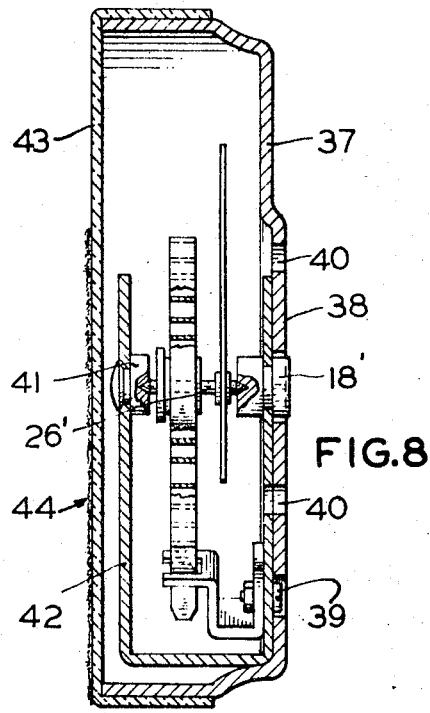
FIGURE 8 is an enlarged cross-sectional view taken along the line 8—8 of FIGURE 7.

Another modification of the thermometer construction is shown in FIGURES 7 and 8. In this arrangement, the temperature scale is formed on the inner surface of a metal case 37 having a depressed circular portion 38 provided with a central opening accommodating a portion of the heat transfer element 18', a clearance opening for a zero-corrector screw 39 and a plurality of air openings 40. The staff 26', pointed at each end, is supported by the element 18' and a bearing 41, said element and bearing being carried by the spaced arms of a U-shaped bracket 42. One leg of this bracket is secured to the circular portion 38 of the case 37. A clear plastic cover 43 is snap-fitted onto the metal case 37. An opaque coating 44 can be applied to the transparent cover 43 for esthetic purposes, such coating having a configuration to obscure the underlying internal mechanism while exposing to view the pointer and the scale. This thermometer also is insertable into the outer housing comprising the base 10 and cover 12 shown in FIGURE 4.

The heat transfer members shown in the drawings are of small size, being of the order of ⅛ inch in diameter, whereby the thermometers are particularly adapted for the measurement of relatively small body areas such as the nose, a toe, finger, etc., and for the exact location of a small "hot spot" on larger body areas. Thermometers provided with larger heat transfer members are particularly useful for exploring large body areas, such as on the abdomen. Also, the heat transfer members can be made to protrude beyond the outer housing so that no part of the housing touches the skin.

As described hereinabove, thermometers made in accordance with the various embodiments of the invention are insertable into the outer plastic housing provided with the transparent cover. Such housing minimizes the possibility of damage to the instrument during shipment, storage and use. Also, this housing serves as a thermal barrier to prevent the bimetallic coil from responding to momentary changes in the temperature of the surrounding air during use of the instrument.

A single thermometer can be moved from spot to spot to locate an area having a higher than normal temperature. Alternatively, a number of thermometers of identical construction, sensitivity and range, can be positioned proximate to each other for the simultaneous exploration of a desired body area.

Figure 9:
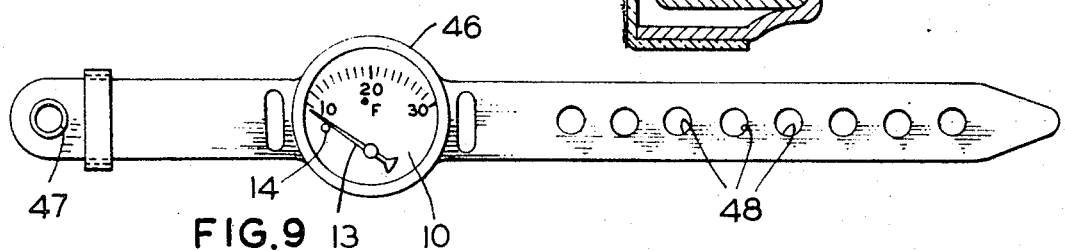
FIGURE 9 is a top plan view showing a flexible strap carrying the thermometer.
Figure 10:
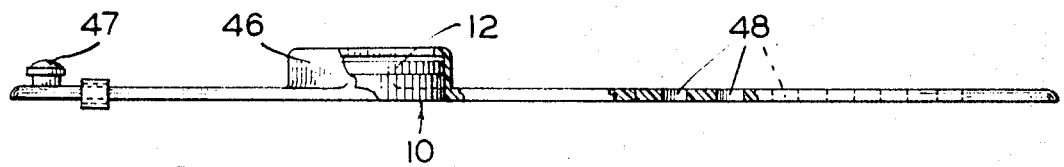
FIGURE 10 is a corresponding side elevational view, part of the thermometer-carrying portion of the strap broken away.

For use in the exploration of certain body areas, such as on an arm, leg or on the forehead, a flexible plastic strap is provided for supporting the thermometers in a desired position. Such strap is shown in FIGURES 9 and 10. The thermometer, enclosed within the outer housing comprising the base 10 and clear cover 12, is press-fitted in the cylindrical barrel 46 of the strap. In use, the plastic button 47, having a head diameter slightly larger than the diameter of the holes 48, is snapped through an appropriate hole, thereby to secure the strap in place and press the bottom of the thermometer against the skin.

Having now described several embodiments of the invention, those skilled in this art will be able to make various changes and modifications without thereby departing from the scope and spirit of the invention.

I claim:
1. A skin temperature thermometer comprising,
 (a) a circular casing comprising a metal cover attached to a metal base, said cover having an opening formed therein and said base including a depressed portion,
 (b) a heat transfer member carried by and extending through the depressed portion of the base, said member having a flat outer surface and a bore formed in the inner surface, which bore is aligned with the opening in said cover,
 (c) a spiral, bimetallic coil disposed within said casing and having an inner end secured to a staff, which staff has one end positioned in the said bore and the other end projecting through the opening in said cover,
 (d) a zero-corrector screw rotatably carried by the said base, said screw having an abutment secured thereto and mechanically-coupled to the other end of the said coil,
 (e) a scale on the outside surface of the cover and calibrated in temperature values,
 (f) a pointer secured to the projecting end of the staff, and
 (g) an outer housing within which the said casing is disposed, which housing comprises a plastic base having a transparent cover secured thereto, said plastic base having formed therein a first opening through which the depressed portion of the said metal case extends and a second opening aligned with the said zero-corrector screw.

2. The invention as recited in claim 1, in combination with a flexible strap having a cylindrical portion open at each end, said housing being press-fitted into the said cylindrical portion.

3. The invention as recited in claim 1, wherein the said plastic base has a circular lip extending outwardly therefrom, the outer wall of said lip lying substantially in the same plane as the outer surface of the said heat transfer member.

References Cited

UNITED STATES PATENTS

| 2,037,874 | 4/1936 | Bandoly | 73—363.7 |
| 2,674,882 | 4/1954 | Doggett | 73—431 |
| 3,019,652 | 2/1962 | Wieszeck | 73—363.7 |
| 3,208,283 | 9/1965 | Kravitz | 73—371 |

LOUIS R. PRINCE, Primary Examiner

W. A. HENRY II, Assistant Examiner